United States Patent
Brandwine et al.

(10) Patent No.: US 10,284,519 B1
(45) Date of Patent: May 7, 2019

(54) DYNAMICALLY UPDATING AUTHENTICATION SCHEMES

(75) Inventors: Eric J. Brandwine, Haymarket, VA (US); Peter N. DeSantis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 481 days.

(21) Appl. No.: 13/356,470

(22) Filed: Jan. 23, 2012

(51) Int. Cl.
*H04L 29/06* (2006.01)

(52) U.S. Cl.
CPC ............ *H04L 63/00* (2013.01); *H04L 63/08* (2013.01)

(58) Field of Classification Search
None
See application file for complete search history.

(56) References Cited

U.S. PATENT DOCUMENTS

| | | | | |
|---|---|---|---|---|
| 6,148,387 A | * | 11/2000 | Galasso et al. | 711/203 |
| 7,073,055 B1 | * | 7/2006 | Freed | H04L 63/123 713/155 |
| 8,635,442 B2 | * | 1/2014 | Agrawal | H04L 9/3268 713/155 |
| 2008/0025515 A1 | * | 1/2008 | Coombs | 380/277 |
| 2008/0252412 A1 | * | 10/2008 | Larsson et al. | 340/5.2 |
| 2009/0030631 A1 | * | 1/2009 | Ko et al. | 702/81 |
| 2010/0281264 A1 | * | 11/2010 | Sakumoto | H04L 9/3247 713/176 |

* cited by examiner

*Primary Examiner* — Joseph P Hirl
*Assistant Examiner* — Leynna T Truvan
(74) *Attorney, Agent, or Firm* — Lee & Hayes, P.C.

(57) ABSTRACT

When requesting network services, clients often supply authentication information such as digital signatures. A network provider may from time to time change its authentication scheme. Clients are notified of the change and are provided with an updated authentication specification. Upon receiving the updated authentication specification, a client updates its authentication logic accordingly, and subsequently prepares and provides authentication information in accordance with the new authentication scheme.

32 Claims, 3 Drawing Sheets

DYNAMICALLY UPDATING AUTHENTICATION SCHEMES

BACKGROUND

Computer devices and applications increasingly rely upon real-time services provided by network sources or providers. In some situations, clients that are requesting network services must authenticate by supplying passwords, identifiers, or other credentials. In addition, requests submitted by clients may be digitally or cryptographically signed so that recipient servers may verify that the requests originated with authorized clients and that the requests have not been altered in transit.

There are various details involved in authenticating clients and requests, and the collection of practices used in a particular environment may be referred to as an authentication scheme, which may in some cases comprise a signature generation scheme. A service provider typically defines an authentication scheme or signature generation scheme for use in conjunction with services offered by the service provider. In order to use the services of a provider, a developer customizes a client application so that it complies with the authentication scheme of the service provider.

In some cases, however, a weakness or flaw may eventually be discovered in a particular authentication scheme, forcing the service provider to update or change its authentication scheme. This typically requires developers to update their applications to comply with the new scheme. However, it may be difficult to motivate developers to make the required updates.

In some cases, developer updates can be forced by simply refusing to honor out-of-date authentication schemes. However, this may break or disable many applications if developers are not diligent in updating their applications. In many situations, a service provider instead provides an updated authentication scheme and allows the old authentication scheme to also be used for an indefinite time. Depending on the ability of the service provider to motivate developers, the service provider may have to allow the use of both authentication schemes for a lengthy period, which may compromise the ability of the service provider to reliably authenticate clients and requests.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes architectures and techniques in which authentication schemes such as signature generation schemes can be dynamically updated during runtime execution of client applications. A client application is designed so that it is capable during its execution of receiving new and/or updated authentication specifications as designated by a provider of network services. The authentication specifications may specify protocols, formats, and practices that are to be observed and implemented by the client application when conducting authentication with a network service. As an example, the authentication specifications may include a signature generation scheme specifying details regarding how to compose a string-to-sign from the parameters of a service request. The authentication specification and/or signature generation scheme may be specified procedurally or declaratively.

The client application may periodically query or communicate with the service provider to see whether updated authentication practices have become available. Upon identifying updated authentication practices, the client application may automatically implement them without intervention or additional attention by the developer or user of the application. Additional security measures may be used when retrieving the authentication practices in order to ensure their authenticity.

Figure 1:
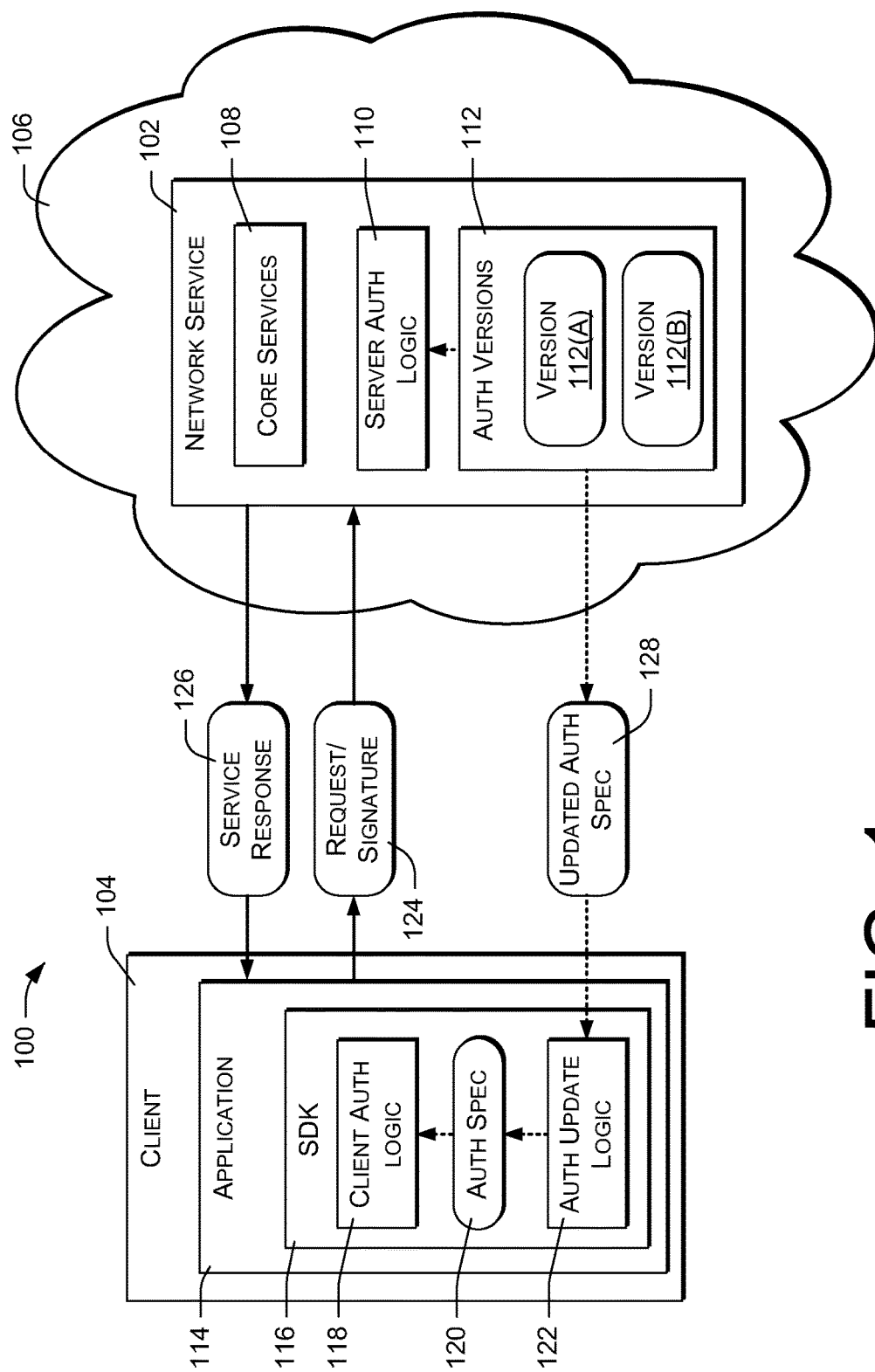
FIG. 1 is a block diagram illustrating an example environment in which the techniques described herein may be implemented.

FIG. 1 shows an example environment 100 in which the described methods and techniques may be practiced. The environment 100 includes a network service 102, which may be implemented by an entity such as a service provider. The network service 102 can typically be accessed and used by a large number of clients, an example of which is illustrated as client 104. Client 104 is representative of a number of clients and/or client applications that may concurrently utilize the network service 102.

Access to the network service 102 is through a network 106, which may comprise a local-area or wide-area network, and which may include the Internet and other private or public networks.

The network service 102 may provide any of a number of different services, such as infrastructure services, information services, email, storage, transaction services, and so forth. The functionality provided by the network service 102 is referred to in FIG. 1 as core services 108. In addition to or as part of the core services 108, the network service 102 may implement server authentication logic 110. The authentication logic 110 may be configured to authenticate requesting clients and/or to authenticate individual requests that are received from clients 104. The authentication logic 110 may be configured to operate and perform authentication in compliance with one or more authentication schemes or versions 112. As an example, the authentication logic 110 may be initially configured to use an authentication scheme version 112(A), and at some later time a second authentication scheme version 112(B) may be introduced. The second version 112(B) may be introduced, for example, to fix a weakness or flaw that is eventually discovered in the first version 112(A). The authentication schemes 112 may indicate how authenticating signatures are to be composed, and therefore may comprise one or more signature generation schemes.

The client 104 may be configured by an application 114 to submit requests to the network service 102 and to receive responses from the network service 102. The application 114 may in some cases utilize an SDK (software development kit) 116 to implement basic communications with the network service 102. The SDK 116 may be designed by the provider of the network service 102, and may include various tools for use by developers in creating applications. For example, the SDK 116 may include APIs (application programming interfaces), executable components or modules, sample code, and so forth. Note that although the described embodiment is shown as using the SDK 116, in other embodiments the components or functionality of the described SDK may be designed and provided independently of the network service 102, such as by the developer of the application 114.

The application 114 and/or the SDK 116 may include client authentication logic 118, which is configured to perform tasks related to authentication between the client 104 and the network service 102. The client authorization logic 118 may be responsive to an authentication specification 120, which specifies practices and details regarding an authentication scheme. The authentication specification 120 may specify various things such as formats, protocols, and so forth that are to be used in authenticating requests with the network service 102. As an example, the authentication specification 120 may define a signature generation scheme, specifying how to create an authenticating signature to be associated with requests to the network service 102.

The application 114 and/or SDK 116 may also include authentication update logic 122. The authentication update logic 122 may be configured to receive updated authentication practices and specifications designated by the network service 102 and, in response, to update the authentication procedures employed by the client authentication logic 118. This will be described in more detail in the following discussion.

The application 114 typically submits multiple requests 124 to the network service 102 over the network 106. Requests may be formatted in accordance with various protocols, such as HTTP (Hypertext Transfer Protocol) and others. Individual requests may specify various parameters, indicating the types and details of services and/or information that are being requested.

Because of the non-session and stateless nature of Internet communications, each received request is typically authenticated, based on a pre-shared secret or other verifiable credentials. Symmetric or asymmetric cryptographic techniques may be used for this purpose. In some embodiments, a public key infrastructure may be used for request authentication.

In many implementations, each request is accompanied by an authenticating signature, which has been formed using cryptographic techniques based on the request and/or the parameters of the request, and in accordance with the authentication specification 120. The signature may be generated using a pre-shared key, or using the private portion of an asymmetric public/private key pair. The signature is in turn verified by the network service 102 in order to authenticate the request. Verification can be performed using the pre-shared key or the public portion of the asymmetric public/private key pair.

Upon receiving the request and signature 124, the network service 102 uses its authentication logic 110 to validate the signature, using one of the authentication schemes or versions 112. Upon validating the signature, a response 126 is provided by the core services 108 to the application 114.

As mentioned above, from time to time the network service 102 may create a new authentication scheme or version, such as the version 112(B) shown in FIG. 1. During its execution, the client application 114, by means of the authentication update logic 122, may receive a notification or alert regarding the existence of the new authentication scheme or version 112(B), and may request and/or receive an updated authentication specification 128. The client authentication specification 120 may, in response, be dynamically replaced with the updated authentication specification 128, and the client authentication logic 118 may thereby be dynamically updated to operate in conjunction with an updated authentication scheme.

In certain embodiments, this updating may be performed unattended; that is, it may be performed during execution of the client application 114, without attention by users, operators, or developers. It may also be performed without restarting the client application 114.

Figure 2:
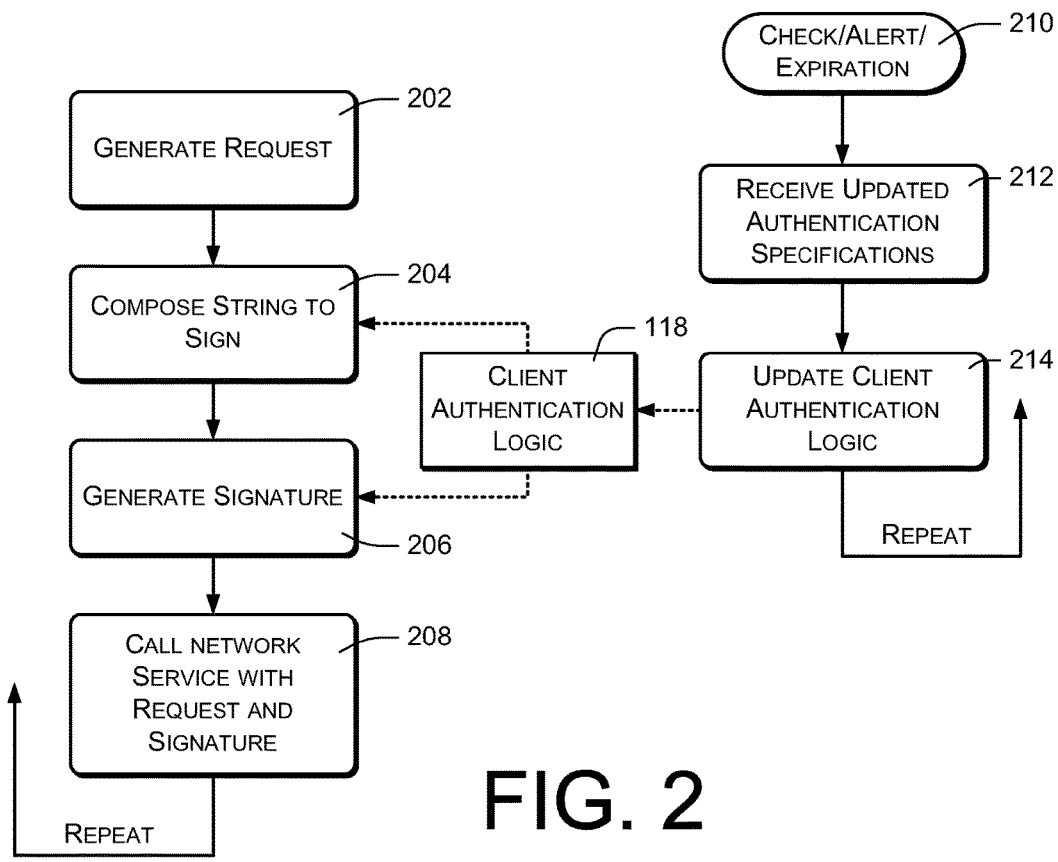
FIGS. 2 and 3 are flow diagrams illustrating example methods of using and updating authentication schemes.

FIG. 2 illustrates example behavior of the client 104, application 114, and/or SDK 116 with respect to using and updating the client authentication logic 118. Actions on the left of FIG. 2 are performed by the client 104 when generating a request and submitting it to the network service 102. Actions on the right of FIG. 2 are performed periodically by the client 104 in order to update the client authentication logic 118 when new authentication practices are designated or implemented by the network service 102.

An action 202 comprises generating a request for submission to the network service 102. The request may comprise a command and multiple parameters. Commands, options, variables, parameters, key/value pairs and so forth may be separated by agreed upon delimiters, and may be otherwise ordered and formatted in accordance with standards that have been agreed upon between the client 104 and the network service 102, and which are defined by a current authentication scheme 112.

The actions 204 and 206 generally comprise creating authentication information for submission to the network service 102. In this example, the authentication information comprises a signature generated with a cryptographic key that has previously been shared between the client 104 and the network service 102. In other implementations, different authentication procedures may be used, and such authentication procedures may or may not include the use of signatures. Generally, the authentication procedures represented by actions 204 and 206 comprise whatever actions are needed for implementing the currently active authentication scheme or version.

In the illustrated implementation, the action 204 comprises composing a string-to-sign based at least in part on the generated request and/or the parameters of the generated request. The string-to-sign can be generated and formatted in various ways, according to a signature generation scheme specified by the currently active authentication scheme. The signature generation scheme may specify an order of parameters within the string as well as allowed delimiter characters and other details. More generally, the signature generation scheme may indicate at least one or more of the following:
 a digital signing protocol for creating the digital signature based on the string-to-sign;
 a cryptographic algorithm for calculating the digital signature; or
 a canonicalization routine for forming the string-to-sign.

The action 206 comprises generating a cryptographic signature that will accompany or be used in conjunction with the request to the network service 102. The signature may be generated using an agreed upon cryptographic function such as a hash function, applied to the composed string to sign and using the pre-shared cryptographic key. Details regarding signature generation, including the particular cryptographic algorithm to be used, may be defined by the currently active authentication scheme.

An action 208 comprises calling the network service with the request and signature, as well as any other information that might be defined by the currently active authentication scheme or by communications protocols and other standards being used. The process along the left side of FIG. 2 is repeated for subsequent requests to the network service 102.

The security and/or authentication related actions, such as the actions 204 and 206, are implemented by the currently configured authentication logic 118 of the client 104, which may be dynamically updated in response to changes implemented or designated by the network service 102. The actions along the right side of FIG. 2 illustrate how such an update may be performed by the client 104. The illustrated actions may be performed by the authentication update logic 122 of FIG. 1. The actions may be performed by and during the execution of the application 114. Furthermore, the actions may be performed unattended, without attention by or interaction with users or developers.

At 210, the client 104 receives an alert or notification that a new authentication version 112 is available. The alert may be a result of periodically checking with or polling the network service, or of receiving an unsolicited notification. In certain implementations, the alert may comprise an error message contained in a response by the network service 102 to a request by the client 104. Such an error message may indicate that the authentication scheme used by the client 104 is no longer valid, and that the client should contact the network service 102 to receive an updated authentication specification 128. In some embodiments, the event represented at 210 may be expiration of a time period for which a current authentication scheme has been specified to be valid. In some embodiments, for example, authentication specifications received by the client 104 may be associated with validity or expiration times. For example, an authentication specification may include a time or time period for which it will be valid.

In response to the notification, alert, or validity expiration 210, the authentication update logic 122 may perform an action 212 of communicating with the network service 102 to receive an updated authentication specification 128, which may be based on one of the authentication schemes or versions 112. Various predefined authentication procedures may be utilized as part of the action 212 to ensure the authenticity of the updated authentication specification 128.

Upon receiving the updated authentication specification 128, the authentication update logic 122 may perform an action 214 of updating its authentication logic 118 and may subsequently begin performing authentication procedures in accordance with the updated authentication logic 118. Updating the authentication logic 118 may comprise replacing or updating code, routines, programs, or module that are part of or associated with the application 114 and/or the SDK 116.

The actions on the right side of FIG. 2 may be performed whenever a new or updated authentication scheme is available from the network service 102. In addition, the actions on the right side of FIG. 2 may be performed upon the first initiation of the application 114, and/or upon every initialization or initiation of the application 114.

The updated authentication specification 128 provided from the network service 102 to the client 104 may comprise one or more of a variety of different types of data objects. For example, the specification 128 may be defined declaratively, and may therefore comprise a textually or symbolically coded definition of various parameters and options to be used when creating, formatting, and transmitting authentication information. As another example, the authentication specification 128 may be defined procedurally, and may therefore comprise code, pseudo code, or other programmatic specifications representing logic that is to be implemented by the authentication update logic 122. As yet another example, the authentication specification 128 may comprise executable code or code images that are to be implemented or executed by the update logic 122.

Figure 3:
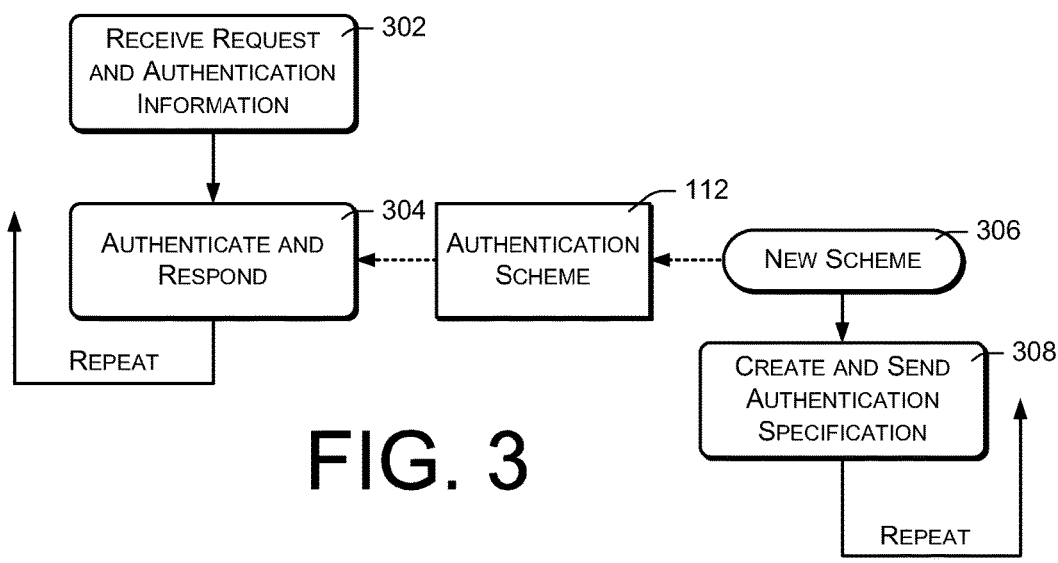

FIG. 3 illustrates an example of actions that may be performed by the network service 102 in the embodiment of FIG. 1. An action 302 comprises receiving a service request from the client 104, along with authentication information. The authentication information may comprise signatures, passwords, tokens, and/or other information as defined the current authentication scheme 112 and implemented by the client authentication logic 118. An action 304 may comprise authenticating the received request and/or the requesting client 104 based on the received authentication information, and responding to the request. The authenticating may be performed in accordance with the currently active authentication scheme 112. The request/response cycle indicated by blocks 302 and 304 may be repeated as multiple requests are received from the client 104.

From time to time, a new authentication scheme may become available, as indicated by the block 306. Within the network service 102, this may cause an update to the current authentication scheme 112. In addition, the network service 102 may respond to the availability of the new authentication scheme by performing an action 308 of creating and indicating/sending an updated authentication specification 128 to the client 104. Note that this updating may be performed independently of the request/response cycle implemented by blocks 302 and 304, although it may also be performed in conjunction with such a request/response cycle. In some embodiments, an expiration or validity time may be associated with the updated authentication specification 128.

The action 308 may be repeated every time a new authentication scheme becomes available. As already described, the client 104 receives the updated authentication specification 128 and implements the specified practices in future requests, when generating authenticating information.

Figure 4:
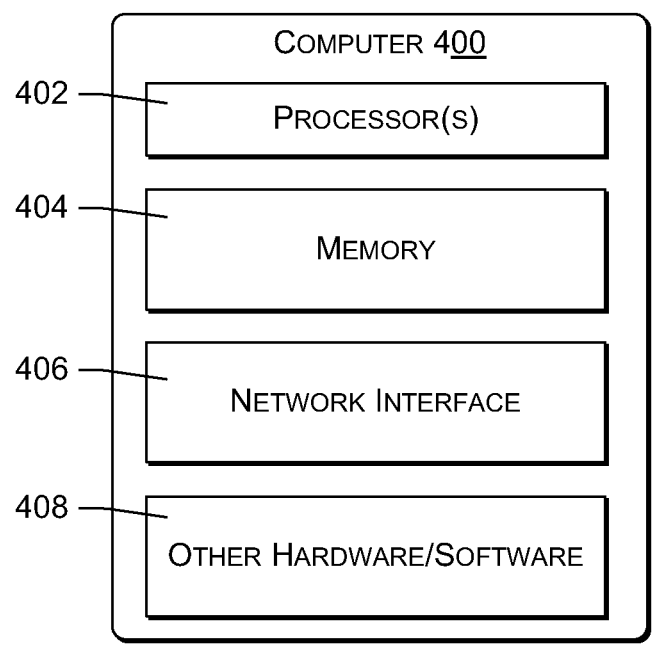
FIG. 4 is a block diagram illustrating an example computer that may be used to implement various ones of the techniques described herein.

FIG. 4 illustrates relevant components of an example computer configuration that may be used to implement aspects of the functionality described above, including functionality attributed above to the client 104, the application 114, the SDK 116, the client authentication logic 118, the network service 102, the server authentication logic 110, and so forth. Generally, a server, service, client, browser, logic component, etc. may be implemented by one or more computers such as this, with the various functionality described above distributed in various ways. In the case of a web service such as the network service 102, computers such as this may be located together or separately, and organized as virtual servers, server banks, and/or server farms. The described functionality may be provided by the servers and computers of a single entity or enterprise, or may utilize the computers and/or services of multiple entities or enterprises.

In a very basic configuration, an example computer 400 might comprise a processing unit 402 composed one of one or more processors, and memory 404. The memory 404 may comprise computer storage media and may include volatile and nonvolatile memory. Thus, the memory 404 may include, but is not limited to, RAM, ROM, EEPROM, flash memory, or other memory technology, or any other medium which can be used to store media items or applications and data which can be accessed by the computer 400.

The memory 404 may be used to store any number of functional components that are executable on the processing unit 402, as well as data that is used by the functional component. Functionality components (not shown) may include an operating system, a web services component, application program interfaces (APIs) and various other components as may be appropriate to implement the functionality described above.

The computer 400 may of course include many logical, programmatic, and physical components, of which those shown in FIG. 4 are merely examples that are related to the discussion herein. As an example, the server 400 may have a network interface 406 for communicating over the network 106. Other hardware and software components of the computer 400 are represented by block 408 of FIG. 4, and may include the usual components of a network-based computer or server.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types. Although flow diagrams are used to represent certain functionality, the order of actions as depicted by the flow diagrams is not intended to be limiting, and in certain situations the depicted actions may be performed in an order that is different than illustrated.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
under control of one or more processors configured with executable instructions, performing actions including:
generating, by an application, a service request to a network services provider that includes one or more request parameters;
composing a string-to-sign based at least in part on the one or more request parameters and in accordance with a predefined digital signature generation scheme defined, at least in part, by the network services provider;
signing the string-to-sign in accordance with the predefined digital signature generation scheme to generate an authenticating digital signature;
submitting, through the application, the service request and the authenticating digital signature;
receiving, from the network services provider, a notification regarding an updated digital signature generation scheme, the notification indicating at least one of an expiration of the predefined digital signature generation scheme or that the predefined digital signature generation scheme is invalid;
receiving, from the network services provider, instructions for creating an authentication signature by implementing the updated digital signature generation scheme; and
in response to receiving the instructions, implementing the updated digital signature generation scheme when subsequently composing and signing the string-to-sign, wherein receiving the instructions for creating the authentication signature and implementing the updated digital signature generation scheme occurs while the application is executing.

2. The method of claim 1, wherein:
the actions are performed by the application during its execution; and
the receiving is performed at least upon initiating the application.

3. The method of claim 1, wherein:
the actions are performed by the application during its execution; and
the receiving is performed at least upon an initial use of the application.

4. The method of claim 1, wherein the updated digital signature generation scheme indicates at least one or more of the following:
a digital signing protocol;
a cryptographic algorithm; or
a canonicalization routine.

5. The method of claim 1, wherein the updated digital signature generation scheme comprises executable code.

6. The method of claim 1, wherein the updated digital signature generation scheme is defined procedurally.

7. The method of claim 1, wherein the updated digital signature generation scheme is defined declaratively.

8. The method of claim 1, further comprising periodically checking with the network services provider for the updated digital signature generation scheme.

9. The method of claim 1, further comprising receiving an error indication in response to submitting the service request, wherein receiving the instructions for creating the authentication signature to result in the updated digital signature generation scheme is performed in response to receiving the error indication.

10. The method of claim 1, wherein receiving the instructions for creating the authentication signature to result in the updated digital signature generation scheme is performed in response to the expiration of the predefined digital signature generation scheme.

11. The method of claim 1, wherein the service request and the authenticating digital signature are submitted to the network services provider.

12. One or more non-transitory computer-readable media including instructions that are executable by one or more processors to perform actions comprising:
generating a digital signature scheme based at least in part on client authentication logic that is predetermined, at least in part, by a network service;
generating a string-to-sign based at least in part on the digital signature scheme and a service request that includes one or more request parameters;
determining a signed string-to-sign based at least in part on the string-to-sign;

generating an authenticating digital signature based at least in part on the signed string-to-sign and the digital signature scheme;
calling the network service from a client application;
submitting, through the client application, the authenticating digital signature;
receiving, from the network service, a notification indicating at least one of an expiration of the digital signature scheme or that the digital signature scheme is no longer valid;
receiving, from the network service, an updated digital signature generation scheme designated by the network service to authorize the client application to call the network service; and
in response to receiving the updated digital signature generation scheme, updating the client authentication logic in accordance with the updated digital signature generation scheme when subsequently generating the string-to-sign and the authenticating digital signature without restarting the client application.

13. The one or more non-transitory computer-readable media of claim 12, wherein receiving the updated digital signature generation scheme and updating the client authentication logic are performed during execution of the client application.

14. The one or more non-transitory computer-readable media of claim 12, wherein receiving the updated digital signature generation scheme and updating the client authentication logic are performed at least upon an application initialization.

15. The one or more non-transitory computer-readable media of claim 12, wherein receiving the updated digital signature generation scheme and updating the client authentication logic are performed, at least in part, in response to a time expiration.

16. The one or more non-transitory computer-readable media of claim 12, wherein the client authentication logic comprises software designated by the network service.

17. The one or more non-transitory computer-readable media of claim 12, wherein the updated digital signature generation scheme is specified declaratively.

18. The one or more non-transitory computer-readable media of claim 12, wherein the updated digital signature generation scheme is specified procedurally.

19. The one or more non-transitory computer-readable media of claim 12, the actions further comprising repeatedly checking with the network service for the updated digital signature generation scheme.

20. The one or more non-transitory computer-readable media of claim 12, the actions further comprising receiving an alert from the network service indicating availability of the updated digital signature generation scheme.

21. The one or more non-transitory computer-readable media of claim 12, the actions further comprising receiving an alert from the network service indicating availability of the updated digital signature generation scheme, the alert being received in conjunction with the calling.

22. The one or more non-transitory computer-readable media of claim 12, the actions further comprising receiving an error in response to submitting the authenticating digital signature, wherein receiving the notification is in response to receiving the error.

23. The one or more non-transitory computer-readable media of claim 12, wherein the updated digital signature generation scheme indicates at least one or more of the following:
 a digital signing protocol;
 a cryptographic algorithm; or
 a canonicalization routine.

24. The one or more non-transitory computer-readable media of claim 12, wherein:
 determining the signed string-to-sign comprises cryptographically signing the string-to-sign; and
 the updated digital signature generation scheme indicates how to compose the string-to-sign.

25. A network-based service, comprising:
 one or more processors;
 computer-readable memory storing instructions that are executable by the one or more processors to perform actions comprising:
 receiving one or more service requests from a client, the one or more service requests being generated by a client application associated with the client and including one or more request parameters;
 receiving authenticating information from the client in conjunction with the one or more service requests, the authenticating information comprising a signed string-to-sign based at least in part on a digital signature generation scheme, wherein the signed string-to-sign is generated based at least in part on the one or more request parameters, and wherein the digital signature generation scheme is at least one of expired or invalid;
 authenticating the one or more service requests based at least in part on the authenticating information;
 notifying the client that the digital signature generation scheme is at least one of expired or invalid; and
 indicating an updated digital signature generation scheme to the client, wherein the updated digital signature generation scheme is to be implemented by the client in order to generate the authenticating information.

26. The network-based service of claim 25, wherein indicating the updated digital signature generation scheme comprises providing executable code to the client.

27. The network-based service of claim 25, wherein indicating the updated digital signature generation scheme comprises providing a declarative specification to the client.

28. The network-based service of claim 25, the actions further comprising associating an expiration time with the updated digital signature generation scheme.

29. The network-based service of claim 25, wherein notifying the client is based at least in part on determining that the digital signature scheme is at least one of expired or invalid.

30. The network-based service of claim 25, the actions further comprising alerting the client to availability of the updated digital signature generation scheme.

31. The network-based service of claim 25, the actions further comprising alerting the client to availability of the updated digital signature generation scheme in response to receiving the one or more service requests.

32. The network-based service of claim 25, wherein the updated digital signature generation scheme indicates at least one or more of the following:
 a digital signing protocol;
 a cryptographic algorithm; or
 a canonicalization routine.

* * * * *